(12) United States Patent
Nishigaki (10) Patent No.: US 9,535,539 B2
(45) Date of Patent: Jan. 3, 2017

(54) PROJECTOR AND ELECTRONIC APPARATUS HAVING PROJECTOR FUNCTION

(75) Inventor: Hiroshi Nishigaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 596 days.

(21) Appl. No.: 13/609,702

(22) Filed: Sep. 11, 2012

(65) Prior Publication Data

US 2013/0069994 A1    Mar. 21, 2013

(30) Foreign Application Priority Data

Sep. 15, 2011  (JP) ................................ 2011-201591

(51) Int. Cl.
*G06F 3/042*  (2006.01)
*H04N 9/31*  (2006.01)
*H04N 9/73*  (2006.01)

(52) U.S. Cl.
CPC ............. *G06F 3/0426* (2013.01); *G06F 3/042* (2013.01); *H04N 9/3129* (2013.01); *H04N 9/3194* (2013.01); *H04N 9/735* (2013.01)

(58) Field of Classification Search
None
See application file for complete search history.

(56) References Cited

U.S. PATENT DOCUMENTS

| 8,123,361 | B2 | 2/2012 | Nagashima et al. |
| 8,515,275 | B2 | 8/2013 | Machida et al. |
| 2006/0139267 | A1* | 6/2006 | Fukuda ................ G09G 3/2011 345/82 |
| 2006/0221063 | A1* | 10/2006 | Ishihara ........................ 345/173 |
| 2009/0262098 | A1 | 10/2009 | Yamada |
| 2010/0067181 | A1* | 3/2010 | Bair ...................... G06F 1/1616 361/679.3 |
| 2011/0058109 | A1 | 3/2011 | Nishigaki et al. |

FOREIGN PATENT DOCUMENTS

| JP | 2006-153580 A | 6/2006 |
| JP | 2009-123006 A | 6/2009 |
| JP | 2009-258569 A | 11/2009 |
| JP | 2010-244484 A | 10/2010 |
| WO | 2009/091038 A1 | 7/2009 |

* cited by examiner

*Primary Examiner* — Kenneth B Lee, Jr.
(74) *Attorney, Agent, or Firm* — Baker & Hostetler LLP (57) ABSTRACT

This projector includes a laser beam generation portion emitting a laser beam on the basis of an input image signal, a projection portion scanning the laser beam, a light detection portion detecting the laser beam reflected by a detection object, and a control portion controlling the laser beam generation portion to project a detection guide beam, different from the laser beam corresponding to the input image signal, for detection by the light detection portion when determining that detection of the laser beam corresponding to the input image signal by the light detection portion is unexpectable on the basis of color information of the input image signal.

20 Claims, 8 Drawing Sheets

| | LASER GRADATION [/256] | REFLECTANCE OF DETECTION OBJECT | LASER OUTPUT VALUE [mW] | TRANS-MITTANCE OF OPTICAL SYSTEM | SENSITIVITY COEFFICIENT [mA/mW] | OUTPUT CURRENT [mA] |
|---|---|---|---|---|---|---|
| R | 256 | 0.7 | 235 | 0.8 | 0.00045 | 0.05922 |
| G | 256 | 0.6 | 200 | 0.6 | 0.00027 | 0.01944 |
| B | 256 | 0.5 | 80 | 0.4 | 0.00018 | 0.00288 |
| | | | | | TOTAL OUTPUT CURRENT | 0.08154 |
| | | | | | ELECTRIC ANALOG I-V CONVERSION GAIN | 40000 TIMES |
| | | | | | EXPECTED DETECTION VOLTAGE | 3.2616(V) |

PROJECTOR AND ELECTRONIC APPARATUS HAVING PROJECTOR FUNCTION

CROSS-REFERENCE TO RELATED APPLICATIONS

The present application claims the benefit of Japanese Application Serial No. 2011-201591, filed Sep. 15, 2011.

BACKGROUND OF THE INVENTION

Field of the Invention

The present invention relates to a projector and an electronic apparatus having a projector function, and more particularly, it relates to a projector and an electronic apparatus having a projector function, each including a light detection portion detecting a laser beam emitted from a laser beam generation portion and reflected by a detection object.

Description of the Background Art

A projector including a light detection portion detecting a laser beam emitted from a laser beam generation portion and reflected by a detection object is known in general, as disclosed in Japanese Patent Laying-Open No. 2009-123006, for example.

The aforementioned Japanese Patent Laying-Open No. 2009-123006 discloses a projector including a laser beam source (laser beam generation portion) emitting a laser beam on the basis of an input image signal, a scanning portion (projection portion) projecting an image on an arbitrary projection area by scanning the laser beam emitted from the laser beam source and a photosensor (light detection portion) detecting the laser beam emitted from the laser beam source and reflected by an external obstacle (detection object).

However, the conventional projector such as that described in the aforementioned Japanese Patent Laying-Open No. 2009-123006 detects the beam reflected by the external obstacle (detection object) with the photosensor thereby detecting the external obstacle, and hence there may conceivably be such a problem that the projector may not be capable of detecting the external object when projecting an image of black or quasi-black hardly allowing detection of the beam reflected by the external obstacle.

SUMMARY OF THE INVENTION

The present invention has been proposed in order to solve the aforementioned problem, and an object of the present invention is to provide a projector and an electronic apparatus having a projector function each capable of reliably detecting a detection object also when a projected image has a color hardly allowing detection of a beam reflected by the detection object.

A projector according to a first aspect of the present invention includes a laser beam generation portion emitting a laser beam on the basis of an input image signal, a projection portion projecting an image on an arbitrary projection area by scanning the laser beam emitted from the laser beam generation portion, a light detection portion detecting the laser beam emitted from the laser beam generation portion and reflected by a detection object, and a control portion controlling the laser beam generation portion to emit a detection guide beam, different from the laser beam corresponding to the input image signal, for detection by the light detection portion and to project the detection guide beam on the arbitrary projection area when determining that detection of the laser beam corresponding to the input image signal by the light detection portion is unexpectable on the basis of color information of the input image signal.

As hereinabove described, the projector according to the first aspect of the present invention is provided with the control portion controlling the laser beam generation portion to emit the detection guide beam, different from the laser beam corresponding to the input image signal, for detection by the light detection portion and to project the detection guide beam on the arbitrary projection area when determining that detection of the laser beam corresponding to the input image signal by the light detection portion is unexpectable on the basis of the color information of the input image signal so that the laser beam generation portion projects the detection guide beam, different from the laser beam corresponding to the input image signal, dedicated to detection on the projection area also when projecting an image of a color whose detection by the light detection is unexpectable, whereby the light detection portion can detect the detection guide beam reflected by the detection object. Thus, the light detection portion can reliably detect the detection object also when the projected image has a color hardly allowing detection of a beam reflected by the detection object. Further, the laser beam generation portion emitting the laser beam on the basis of the image signal for forming the projected image emits the detection guide beam for detection by the light detection portion so that the laser beam generation portion can also be employed as a generation portion for the detection guide beam, whereby no generation portion such as an infrared beam generation portion dedicated to the detection guide beam may be provided. Consequently, the structure of the projector can be simplified.

In the aforementioned projector according to the first aspect, the control portion is preferably formed to acquire an expected detection value of the light detection portion on the basis of the color information of the input image signal and to control the laser beam generation portion to emit the detection guide beam, different from the laser beam corresponding to the input image signal, for detection by the light detection portion and to project the detection guide beam on the arbitrary projection area when the acquired expected detection value is smaller than a prescribed threshold. According to this structure, the light detection portion can reliably detect the detection object with the detection guide beam emitted from the laser beam generation portion and reflected by the detection object also when the expected detection value of the light detection portion based on the color information of the input image signal is smaller than the prescribed threshold.

In this case, the control portion is preferably formed to control the laser beam generation portion to emit the detection guide beam and to project the detection guide beam on the arbitrary projection area when the expected detection value is smaller than the prescribed threshold and a projection state continuously remains unchanged for a prescribed time. According to this structure, the laser beam generation portion emits the detection guide beam only when such a state that the expected detection value is smaller than the prescribed threshold and detection by the light detection portion is unexpectable continues for the prescribed time, whereby the image based on the input image signal can be inhibited from occurrence of noise or the like resulting from the detection guide beam to the utmost.

In the projector having the aforementioned structure acquiring the expected detection value on the basis of the color information, the control portion is preferably formed to specify the position of the detection object on the basis of a result of detection of the laser beam, corresponding to the input image signal, reflected by the detection object without projecting the detection guide beam when the acquired expected detection value is in excess of the prescribed threshold. According to this structure, the control portion specifies the position of the detection object with the laser beam corresponding to the input image signal without employing the detection guide beam when the expected detection value is in excess of the prescribed threshold and detection by the light detection portion is expectable, whereby the image based on the input image signal can be inhibited from occurrence of noise or the like resulting from the detection guide beam to the utmost.

In the aforementioned projector according to the first aspect, the control portion is preferably formed to specify the position of the detection object on the basis of a scanning position of the detection guide beam with the projection portion at a time when the light detection portion detects the detection guide beam reflected by the detection object. According to this structure, the control portion can easily specify the position of the detection object on the basis of the detection guide beam reflected by the detection object and the scanning position of the detection guide beam by the projection portion at the time when the light detection portion detects the detection guide beam also when detection of the reflected laser beam corresponding to the input image signal is unexpectable.

In the aforementioned projector according to the first aspect, the control portion is preferably formed to control the laser beam generation portion to emit the detection guide beam different from the laser beam corresponding to the input image signal and to project the detection guide beam on the arbitrary projection area when the input image signal is an image signal of black or quasi-black. According to this structure, the light detection portion can reliably detect the detection object with the detection guide beam emitted from the laser beam generation portion also when an image of black or quasi-black hardly allowing detection of the beam reflected by the detection object is projected on the projection area.

In the aforementioned projector according to the first aspect, the laser beam generation portion preferably includes a red laser beam generation portion emitting a red laser beam, a green laser beam generation portion emitting a green laser beam and a blue laser beam generation portion emitting a blue laser beam, and the control portion is preferably formed to control at least one of the red laser beam generation portion, the green laser beam generation portion and the blue laser beam generation portion emitting a laser beam highly reflectable by the detection object to emit the detection guide beam. According to this structure, the detection guide beam can be constituted of the laser beam highly reflectable by the detection object, whereby the light detection portion can accurately detect the detection guide beam reflected by the detection object.

In the aforementioned projector according to the first aspect, the laser beam generation portion preferably includes a red laser beam generation portion emitting a red laser beam, a green laser beam generation portion emitting a green laser beam and a blue laser beam generation portion emitting a blue laser beam, the light detection portion preferably has such characteristics that detection sensitivity varies with the wavelength of the detected laser beam, and the control portion is preferably formed to control at least one of the red laser beam generation portion, the green laser beam generation portion and the blue laser beam generation portion emitting a laser beam having a wavelength detectable by the light detection portion with excellent detection sensitivity to emit the detection guide beam. According to this structure, the detection guide beam can be constituted of the laser beam having the wavelength detectable by the light detection portion with excellent detection sensitivity, whereby the light detection portion can accurately detect the detection guide beam reflected by the detection object.

In the projector having the aforementioned structure applying the laser beam highly reflectable by the detection object or the laser beam detectable by the light detection portion with excellent detection sensitivity, the light detection portion preferably includes such a light detection portion that detection sensitivity for the red laser beam is superior to detection sensitivity for the green and blue laser beams, and the control portion is preferably formed to control the red laser beam generation portion to emit the detection guide beam consisting of the red laser beam. According to this structure, the red laser beam generation portion emits the red laser beam maximally reflectable by the detection object and detectable with the highest detection sensitivity as the detection guide beam, whereby the light detection portion can accurately detect the reflected detection guide beam consisting of the red laser beam.

In the aforementioned projector according to the first aspect, the control portion is preferably formed to control the projection portion to project the image while changing the position of the detection guide beam in the arbitrary projection area every image display frame projected on the projection area on the basis of an analytical result of the color information of the input image signal. According to this structure, the control portion changes the position of the detection guide beam in the arbitrary projection area every image display frame, whereby the light detection portion can reliably detect the detection object regardless of the position of the detection object in the projection area.

In the aforementioned projector according to the first aspect, the control portion is preferably formed to control the laser beam generation portion to project the detection guide beam into the arbitrary projection area every plurality of image display frames projected on the projection area on the basis of an analytical result of the color information of the input image signal. According to this structure, the image can be inhibited from occurrence of noise or the like resulting from the detection guide beam dissimilarly to a case of projecting the detection guide beam every image display frame, whereby the quality of the projected image can be inhibited from reduction.

In the projector having the aforementioned structure projecting the detection guide beam every image display frame, the control portion is preferably formed to control the laser beam generation portion to project the detection guide beam on a partial line among lines of the laser beam scanned when forming one image display frame. According to this structure, the laser beam generation portion can project the detection guide beam while overlapping the same only part of the image based on the input image signal, whereby the image based on the image signal can be inhibited from occurrence of noise resulting from the detection guide beam.

In the aforementioned projector according to the first aspect, the control portion is preferably formed to control the laser beam generation portion to emit the detection guide beam and to project the detection guide beam on the arbitrary area when determining that detection of the laser beam corresponding to the input image signal by the light detection portion is unexpectable on the basis of the color information of the input image signal in a normal mode and to control the laser beam generation portion to emit the detection guide beam and to project the detection guide beam on the arbitrary projection area in a case of such an energy-saving mode that the image based on the input image signal is not projected when the energy-saving mode is continued for a prescribed time. According to this structure, the light detection portion can reliably detect the detection object with the detection guide beam emitted from the laser beam generation portion also in the case of such an energy-saving mode that the image based on the input image signal is not projected. Further, the control portion can perform processing such as that of switching the projector from the energy-saving mode to the normal mode (returning the projector to the normal mode) on the basis of the result of this detection.

In this case, the control portion is preferably formed to control the laser beam generation portion to project the detection guide beam on the arbitrary projection area in addition to the laser beam corresponding to the input image signal when projecting the laser beam corresponding to the input image signal in the normal mode and to control the laser beam generation portion to project only the detection guide beam on the arbitrary projection area in the energy-saving mode. According to this structure, the projector can reliably detect the detection object by projecting the detection guide beam in the state projecting the image based on the input image signal in the normal mode, and can detect the detection object by projecting only the detection guide beam in the energy-saving mode.

In the projector having the aforementioned structure projecting the detection guide beam when the energy-saving mode is continued for the prescribed time, the control portion is preferably formed to return the projector from the energy-saving mode to the normal mode when the light detection portion detects the detection guide beam reflected by the detection object in the energy-saving mode. According to this structure, the user can easily return the projector from the energy-saving mode to the normal mode by simply arranging the detection object on the projection area.

An electronic apparatus having a projector function according to a second aspect of the present invention includes a laser beam generation portion emitting a laser beam on the basis of an input image signal, a projection portion projecting an image on an arbitrary projection area by scanning the laser beam emitted from the laser beam generation portion, a light detection portion detecting the laser beam emitted from the laser beam generation portion and reflected by a detection object, and a control portion controlling the laser beam generation portion to emit a detection guide beam, different from the laser beam corresponding to the input image signal, for detection by the light detection portion and to project the detection guide beam on the arbitrary projection area when determining that detection of the laser beam corresponding to the input image signal by the light detection portion is unexpectable on the basis of color information of the input image signal.

As hereinabove described, the electronic apparatus having a projector function according to the second aspect of the present invention is provided with the control portion controlling the laser beam generation portion to emit the detection guide beam, different from the laser beam corresponding to the input image signal, for detection by the light detection portion and to project the detection guide beam on the arbitrary projection area when determining that detection of the laser beam corresponding to the input image signal by the light detection portion is unexpectable on the basis of the color information of the input image signal so that the laser beam generation portion projects the detection guide beam, different from the laser beam corresponding to the input image signal, dedicated to detection on the projection area also when projecting an image of a color whose detection by the light detection is unexpectable, whereby the light detection portion can detect the detection guide beam reflected by the detection object. Thus, the light detection portion can reliably detect the detection object also when the projected image has a color hardly allowing detection of a beam reflected by the detection object. Further, the laser beam generation portion emitting the laser beam on the basis of the image signal for forming the projected image emits the detection guide beam for detection by the light detection portion so that the laser beam generation portion can also be employed as a generation portion for the detection guide beam, whereby no generation portion such as an infrared beam generation portion dedicated to the detection guide beam may be provided. Consequently, the structure of the electronic apparatus having a projector function can be simplified.

In the aforementioned electronic apparatus having a projector function according to the second aspect, the control portion is preferably formed to acquire an expected detection value of the light detection portion on the basis of the color information of the input image signal and to control the laser beam generation portion to emit the detection guide beam, different from the laser beam corresponding to the input image signal, for detection by the light detection portion and to project the detection guide beam on the arbitrary projection area when the acquired expected detection value is smaller than a prescribed threshold. According to this structure, the light detection portion can reliably detect the detection object with the detection guide beam emitted from the laser beam generation portion and reflected by the detection object also when the expected detection value of the light detection portion based on the color information of the input image signal is smaller than the prescribed threshold.

In this case, the control portion is preferably formed to control the laser beam generation portion to emit the detection guide beam and to project the detection guide beam on the arbitrary projection area when the expected detection value is smaller than the prescribed threshold and a projection state continuously remains unchanged for a prescribed time. According to this structure, the laser beam generation portion emits the detection guide beam only when such a state that the expected detection value is smaller than the prescribed threshold and detection by the light detection portion is unexpectable continues for the prescribed time, whereby the image based on the input image signal can be inhibited from occurrence of noise or the like resulting from the detection guide beam to the utmost.

In the electronic apparatus having a projector function having the aforementioned structure acquiring the expected detection value on the basis of the color information, the control portion is preferably formed to specify the position of the detection object on the basis of a result of detection of the laser beam, corresponding to the input image signal, reflected by the detection object without projecting the detection guide beam when the acquired expected detection value is in excess of the prescribed threshold. According to this structure, the control portion specifies the position of the detection object with the laser beam corresponding to the input image signal without employing the detection guide beam when the expected detection value is in excess of the prescribed threshold and detection by the light detection portion is expectable, whereby the image based on the input image signal can be inhibited from occurrence of noise or the like resulting from the detection guide beam to the utmost.

In the aforementioned electronic apparatus having a projector function according to the second aspect, the control portion is formed to specify the position of the detection object on the basis of a scanning position of the detection guide beam with the projection portion at a time when the light detection portion detects the detection guide beam reflected by the detection object. According to this structure, the control portion can easily specify the position of the detection object on the basis of the detection guide beam reflected by the detection object and the scanning position of the detection guide beam by the projection portion at the time when the light detection portion detects the detection guide beam reflected by the detection object also when detection of the reflected laser beam corresponding to the input image signal is unexpectable.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

The structure of a projector 100 according to a first embodiment of the present invention is described with reference to FIGS. 1 and 2. The projector 100 is an example of the "electronic apparatus having a projector function" in the present invention.

Figure 1:
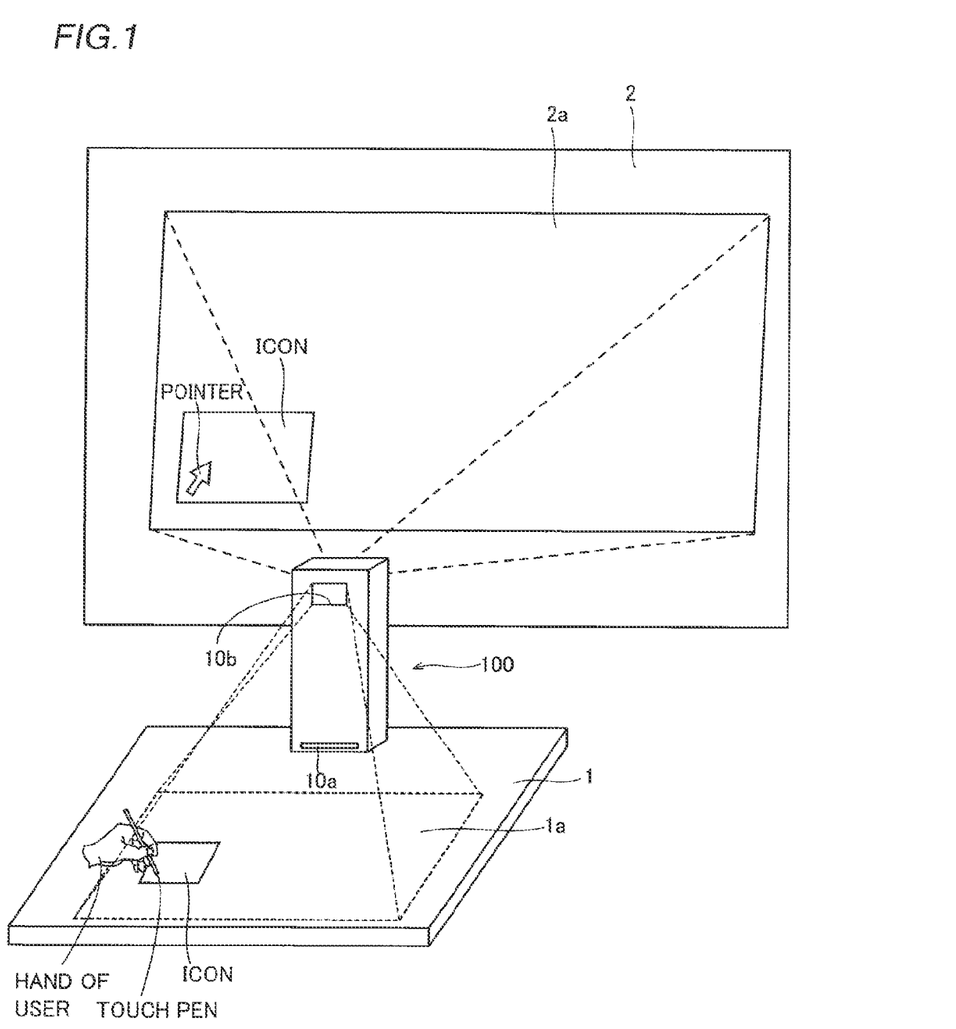
FIG. 1 is a schematic diagram showing a used state of a projector according to a first embodiment of the present invention.

The projector 100 according to the first embodiment of the present invention is formed to be used in a state arranged on a table 1, as shown in FIG. 1. Further, the projector 100 is formed to project an image 2a for presentation (for display) onto a projection area such as a screen 2. In addition, the projector 100 is formed to project an image 1a similar to the image 2a for presentation onto the upper surface of a projection area such as the table 1. The projector 100 projects the image 1a on the table 1 so that the magnitude thereof is smaller than that of the image 2a projected on the screen 2. The table 1 and the screen 2 are examples of the "projection area" in the present invention.

Figure 3:
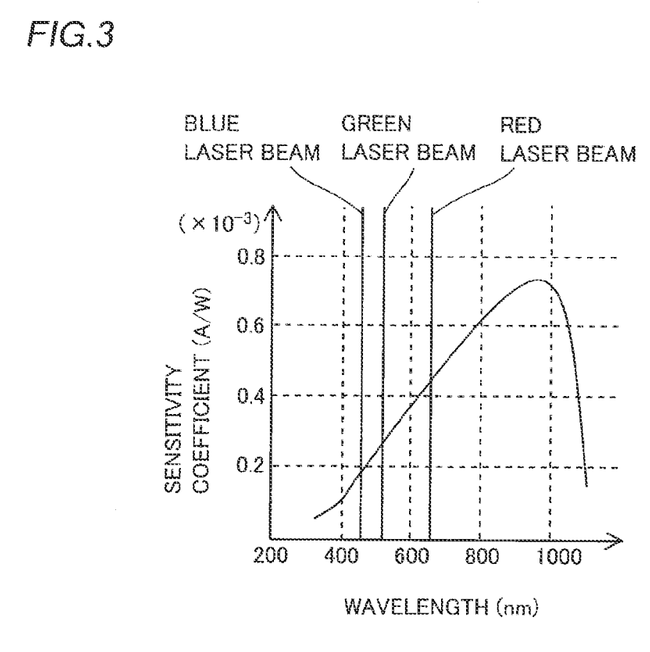
FIG. 3 illustrates detection sensitivity characteristics of a light detection portion of the projector according to the first embodiment of the present invention.

A silicon photodiode 10a for detecting laser beams reflected by the finger(s) of the user or a touch pen is provided on a side surface of the projector 100 projecting the image 1a. The silicon photodiode 10a has a function of detecting laser beams by converting received laser beams to currents. Further, the silicon photodiode 10a has such detection sensitivity characteristics that the detection sensitivity varies with the wavelengths (colors) of the received beams, as shown in FIG. 3. More specifically, the detection sensitivity of the silicon photodiode 10a is high in order of red (650 nm), green (520 nm) and blue (440 nm), and gradually increases as approaching red from blue. The silicon photodiode 10a is an example of the "light detection portion" in the present invention.

A laser projection port 10b emitting red, green and blue visible laser beams is provided above the silicon photodiode 10a of the projector 100, as shown in FIG. 1.

Figure 2:
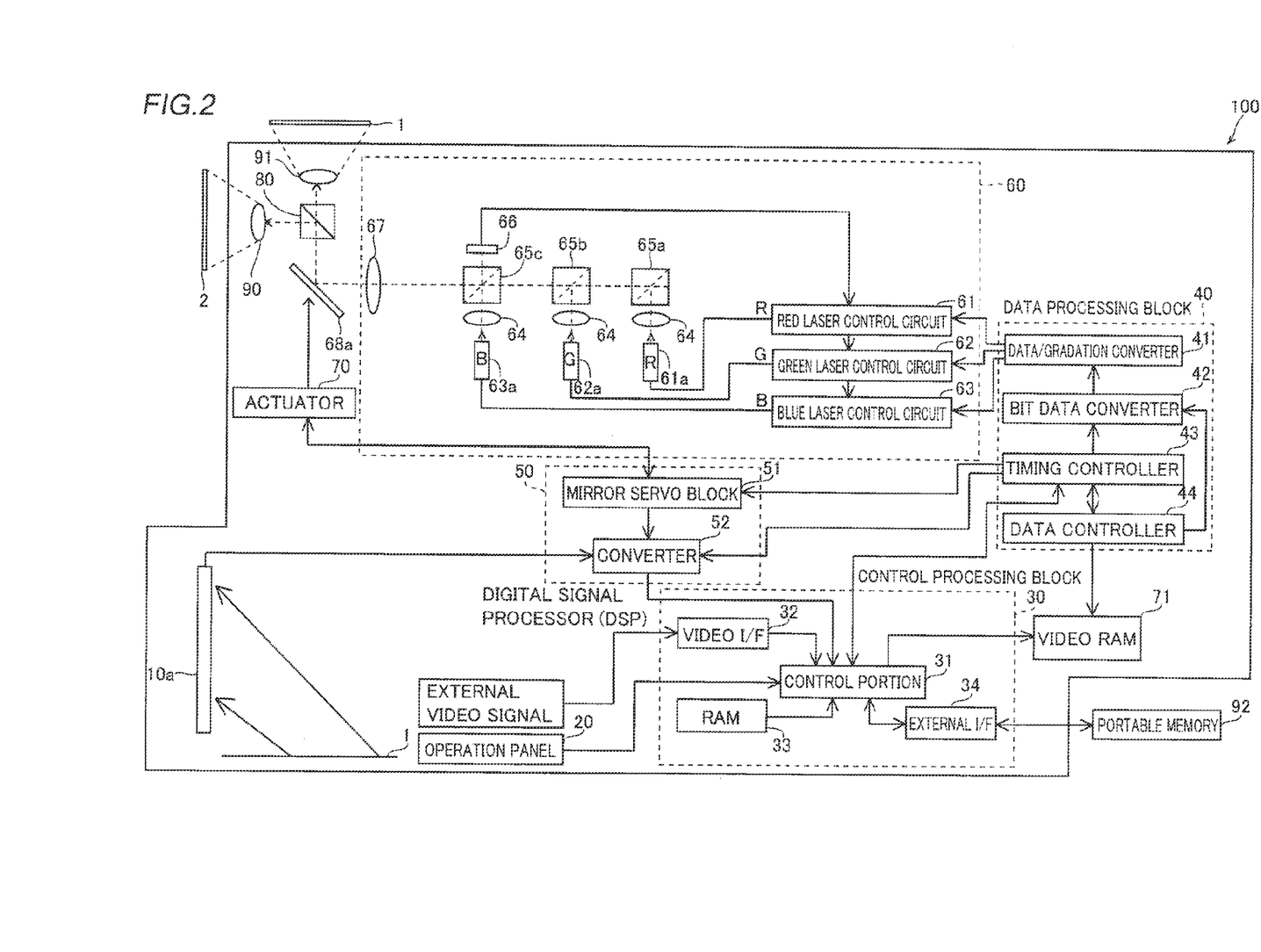
FIG. 2 is a block diagram showing the structure of the projector according to the first embodiment of the present invention.

The projector 100 includes an operation panel 20, a control processing block 30, a data processing block 40, a digital signal processor (DSP) 50, a laser beam source 60, a video RAM 71, a beam splitter 80 and two magnifying lenses 90 and 91, as shown in FIG. 2. The laser beam source 60 is an example of the "laser beam generation portion" in the present invention.

The control processing block 30 includes a control portion 31 controlling the overall projector 100, a video I/F 32 which is an interface (I/F) for receiving an external video signal, a RAM 33, and an external I/F 34.

The data processing block 40 includes a data/gradation converter 41, a bit data converter 42, a timing controller 43 and a data controller 44.

The digital signal processor 50 includes a mirror servo block 51 and a converter 52.

The laser beam source 60 includes a red laser control circuit 61, a green laser control circuit 62 and a blue laser control circuit 63. A red LD (laser diode) 61a emitting a red laser beam (visible laser beam), a green LD 62a emitting a green laser beam (visible laser beam) and a blue LD 63a emitting a blue laser beam (visible laser beam) are connected to the red laser control circuit 61, the green laser control circuit 62 and the blue laser control circuit 63 respectively. The laser beam source 60 is formed to emit the laser beams on the basis of the external video signal, described later, input in the projector 100 or data stored in a portable memory 92. The red LD 61a is an example of the "red laser beam generation portion" in the present invention. The green LD 62a is an example of the "green laser beam generation portion" in the present invention. The blue LD 63a is an example of the "blue laser beam generation portion" in the present invention.

The laser beam source 60 further includes three collimator lenses 64, three polarizing beam splitters 65a, 65b and 65c, a light detector 66 and a lens 67. The projector 100 is further provided with an MEMS mirror 68a for horizontally and vertically scanning the laser beams and an actuator 70 for horizontally vertically driving the MEMS mirror 68a. The MEMS mirror 68a is an example of the "projection portion" in the present invention.

The projector 100 is so formed that the laser beams emitted by the red LD 61a, the green LD 62a and the blue LD 63*a* respectively are introduced into the common MEMS mirror 68*a*. The MEMS mirror 68*a* scans the red, green and blue laser beams emitted from the red LD 61*a*, the green LD 62*a* and the blue LD 63*a* respectively, thereby projecting the images 1*a* and 2*a* on the table 1 and the screen 2 respectively. The MEMS mirror 68*a* is formed to project images on arbitrary projection areas by scanning the laser beams emitted from the laser beam source 60.

As shown in FIG. 2, the operation panel 20 is provided on a front or side surface of a housing of the projector 100. The operation panel 20 includes a display (not shown) for displaying operation contents, switches accepting operational inputs into the projector 100 and the like, for example. The operation panel 20 is formed to transmit a signal responsive to operation contents to the control portion 31 of the control processing block 30 when accepting an operation of the user.

The projector 100 is so formed that the external video signal supplied from outside is input in the video I/F 32. The external I/F 34 is so formed that the portable memory 92 such as an SD card or a USB memory, for example, is mountable thereon. A PC or the like is connectable to the external I/F 34 through a cable or the like, and the external I/F 34 is formed to function as an output portion capable of transmitting positional information or the like of the touch pen grasped by the user to the PC. The projector 100 is so formed that the control portion 31 reads data from the portable memory 92 and the video RAM 71 stores the read data.

The control portion 31 is formed to control display of a picture based on image data temporarily held in the RAM 71 by intercommunicating with the timing controller 43 of the data processing block 40.

In the data processing block 40, the timing controller 43 is formed to read data held in the video RAM 71 through the data controller 44 on the basis of a signal output from the control portion 31. The data controller 44 is formed to transmit the read data to the bit data converter 42. The bit data converter 42 is formed to transmit the data to the data/gradation converter 41 on the basis of a signal from the timing controller 43. The bit data converter 42 has a function of converting externally supplied image data to data suitable to a system projectable with the laser beams.

The data/gradation converter 41 is formed to convert data output from the bit data converter 42 to gradations of three colors of red (R), green (G) and blue (B) and to transmit data of the converted gradations to the red laser control circuit 61, the green laser control circuit 62 and the blue laser control circuit 63 respectively.

The red laser control circuit 61 is formed to control the red LD 61*a* to exhibit a laser output value corresponding to the gradation on the basis of the gradation data received from the data/gradation converter 41. The green laser control circuit 62 is formed to control the green LD 62*a* to exhibit a laser output value corresponding to the gradation on the basis of the gradation data received from the data/gradation converter 41. The blue laser control circuit 63 is formed to control the blue LD 63*a* to exhibit a laser output value corresponding to the gradation on the basis of the gradation data received from the data/gradation converter 41.

The silicon photodiode 10*a* provided on the surface of the projector 100 projecting the image 1*a* is formed to detect the laser beams emitted from the laser beam source 60 and reflected by a detection object. Further, the silicon photodiode 10*a* is formed to input a signal received therein into the control portion 31 through the converter 52.

According to the first embodiment, the control portion 31 is formed to acquire an expected detection voltage of the silicon photodiode 10*a* on the basis of the gradation of an input image signal and to control the red LD 61*a* to emit a detection guide beam, different from a laser beam corresponding to the input image signal, for detection by the silicon photodiode 10*a* and to project the same on an arbitrary projection area when the acquired expected detection voltage is smaller than a prescribed threshold of the silicon photodiode 10*a*. In other words, the control portion 31 is formed to control the red LD 61*a* to project a red detection guide beam on the arbitrary projection area when detection of the laser beams corresponding to the input image signal by the silicon photodiode 10*a* is unexpectable. The expected detection voltage is an example of the "expected detection value" in the present invention.

Figure 4:
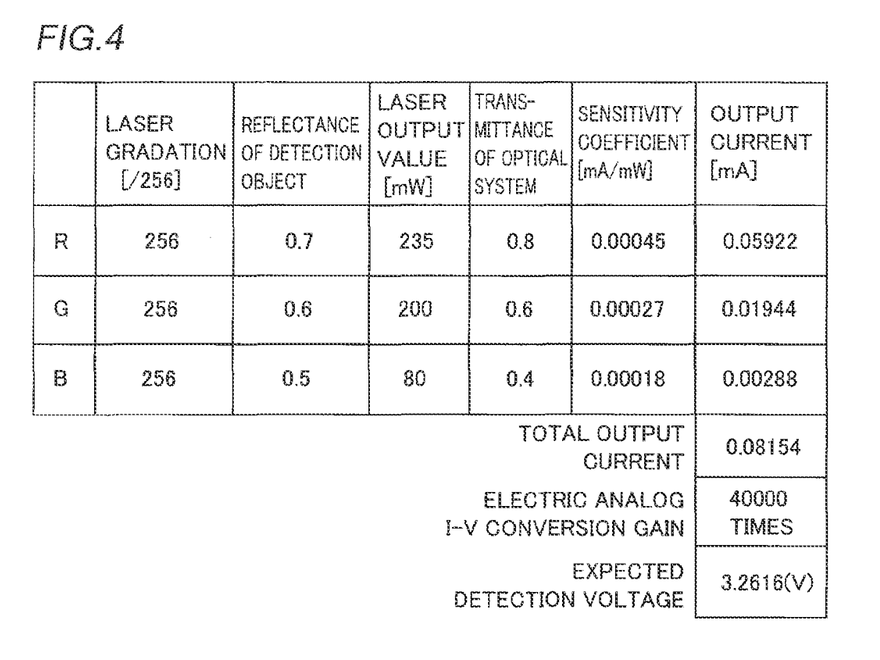
FIG. 4 is a diagram for illustrating a method of calculating an expected detection voltage in the projector according to the first embodiment of the present invention.

The control portion 31 is formed to read information related to gradations from the external video signal input through the video I/F 32 or the image signal input from the portable memory 92 connected thereto through the external I/F 34 and to acquire the laser output values of the red LD 61*a*, the green LD 62*a* and the blue LD 63*a* as analytical results of the gradations. Further, the control portion 31 is formed to recognize that a new image has been input by reading the information related to the gradations from the external video signal input through the video I/F 32 or the image signal input from the portable memory 92 connected thereto through the external I/F 34. The control portion 31 calculates the laser output values as to the respective ones of the red LD 61*a*, the green LD 62*a* and the blue LD 63*a*. In a case of projecting a white image, for example, all of the red, green and blue laser beams are output with the maximum 256 gradations, and the red LD 61*a*, the green LD 62*a* and the blue LD 63*a* exhibit laser output values of 235 (mW), 200 (mW) and 80 (mW) respectively at this time, as shown in FIG. 4. Thus, the output values of the maximum gradations vary with the red, green and blue laser beams. When the color of the projected image is not white, the laser output values of the red LD 61*a*, the green LD 62*a* and the blue LD 63*a* fluctuate in response to ratios of change of the gradations of red, green and blue with respect to white. The gradations are examples of the "color information" in the present invention.

The reflectance of the detection object varies with the red, green and blue laser beams. Transmittance values of optical systems correspond to those of the laser beams with respect to the collimator lenses 64, the polarizing beam splitters 65*a*, 65*b* and 65*c*, the lens 67, the beam splitter 80 and the magnifying lenses 90 and 91, and vary with the red, green and blue laser beams.

The control portion 31 is formed to measure (to perform offset calculation of) the reflectance of the detection object varying with the red, green and blue laser beams and the transmittance values of the optical systems varying with the red, green and blue laser beams before any image is input in the projector 100. The control portion 31 calculates the expected detection voltage by employing sensitivity coefficients for the red, green and blue laser beams obtained on the basis of the detection sensitivity characteristics of the silicon photodiode 10*a* shown in FIG. 3. According to the first embodiment, the sensitivity coefficients of the silicon photodiode 10*a* for the red, green and blue laser beams are 0.00045 (mA/mW), 0.00027 (mA/mW) and 0.00018 (mA/mW) respectively, and the silicon photodiode 10*a* has the highest sensitivity coefficient for the red laser beam. The control portion 31 is formed to read information of the detection sensitivity characteristics of the silicon photodiode 10a from the RAM 33.

The control portion 31 calculates output currents by multiplying the laser output values as the analytical results of the gradations, the reflectance values of the detection object, the transmittance values of the optical systems and the sensitivity coefficients together as to the red (R), green (G) and blue (B) laser beams respectively and calculates a total output current by adding up the output currents of the red, green and blue laser beams, as shown in FIG. 4. Thereafter the control portion 31 calculates the expected detection voltage by multiplying the total output current by an electric analog I/V gain (40000 times). The control portion 31 is formed to control the red LD 61a to emit the detection guide beam, different from the laser beam corresponding to the input image signal, for the detection by the silicon photodiode 10a and to project the same on the arbitrary projection area when the expected detection voltage calculated through the aforementioned procedure is smaller than the prescribed threshold of the silicon photodiode 10a in a normal mode. More detailedly, the control portion 31 is formed to control the red LD 61a to emit the detection guide beam and to project the same on the arbitrary projection area when the expected detection voltage is smaller than the threshold of the silicon photodiode 10a and a projection state continuously remains unchanged for a prescribed time (one minute, for example). According to the first embodiment, the expected detection voltage of 0.74025 (V), obtained in a case of setting the gradations of the red (R), green (G) and blue (B) laser beams to 80, 0 and 0 respectively, is set as the prescribed threshold of the silicon photodiode 10a.

The control portion 31 is formed to control the red LD 61a, emitting the red laser beam detectable by the silicon photodiode 10a with superior detection sensitivity to that for the green and blue laser beams and reflected by the detection object with higher reflectance than the green and blue laser beams, to emit the detection guide beam. In other words, the control portion 31 controls the red LD 61a to emit the detection guide beam consisting of the red laser beam. According to the first embodiment, the gradation of the detection guide beam consisting of the red (R) laser beam emitted from the red LD 61a is set to 120. In other words, the expected detection voltage of the detection guide beam is larger than the threshold (expected detection voltage in the case of setting the gradation of the red R laser beam to 80) of the silicon photodiode 10a. The control portion 31 is formed to control the red LD 61a to project the detection guide beam in addition to the laser beam corresponding to the input image signal when the expected detection voltage based on the gradation of the input image signal is smaller than the threshold of the silicon photodiode 10a in the normal mode. Further, the control portion 31 is formed to specify the position of the detection object on the basis of a scanning position with the MEMS mirror 68a upon detection of the detection guide beam, reflected by the detection object, by the silicon photodiode 10a. In addition, the control portion 31 is formed to control the red LD 61a to project only the laser beam corresponding to the input image signal on the arbitrary projection area without projecting the detection guide beam when the expected detection voltage based on the gradation of the input image signal is larger than the prescribed threshold of the silicon photodiode 10a and to specify the position of the detection object on the basis of the scanning position with the MEMS mirror 68a upon detection of the detection guide beam, reflected by the detection object, by the silicon photodiode 10a.

According to the first embodiment, none of the red, green and blue LDs 61a, 62a and 63a emits the laser beam corresponding to the input image signal when the color of the input image signal is black. In this case, the control portion 31 controls the red LD 61a to emit only the detection guide beam. When the color of the input image signal is quasi-black such as gray, at least one of the red, green and blue LDs 61a, 62a and 63a emits a laser beam corresponding to quasi-black, while the expected detection voltage is smaller than the threshold of the silicon photodiode 10a in this case, and hence the control portion 31 controls the red LD 61a to emit the detection guide beam. In other words, the projector 100 according to the first embodiment is formed to emit the detection guide beam when no beams are reflected by the detection object (the finger(s) of the user or the touch pen) or the color of the image signal is black or quasi-black hardly allowing sufficient reflection of the laser beams.

Figure 5:
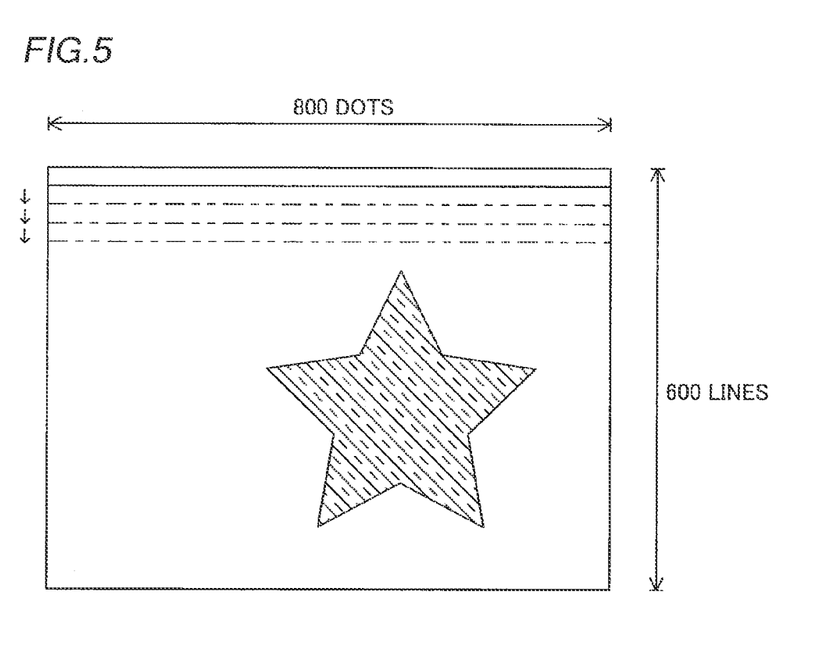
FIG. 5 illustrates a state of projecting a detection guide beam on a projection area in the projector according to the first embodiment of the present invention.

The RAM 33 stores information for generating the detection guide beam. The control portion 31 controls the red LD 61a to emit the detection guide beam in part of lines of the laser beam scanned for forming one frame. More specifically, the control portion 31 controls the red LD 61a to project the detection guide beam on one horizontal line every frame on the basis of the information stored in the RAM 33. Further, the control portion 31 controls the red LD 61a to change the position of the guide beam every frame. With reference to a projection area of 800 by 600 (pixels) shown in FIG. 5, for example, the control portion 31 controls the red LD 61a to project the detection guide beam while deviating the position thereof by 10 lines (at intervals of 10 lines) among 600 horizontal lines downward from above. Thus, the control portion 31 performs control of roughly searching the detection object downward from above in the overall projection area. According to the first embodiment, the frame is switched every $\frac{1}{60}$ (sec). The frame is an example of the "image display frame" in the present invention.

Figure 6:
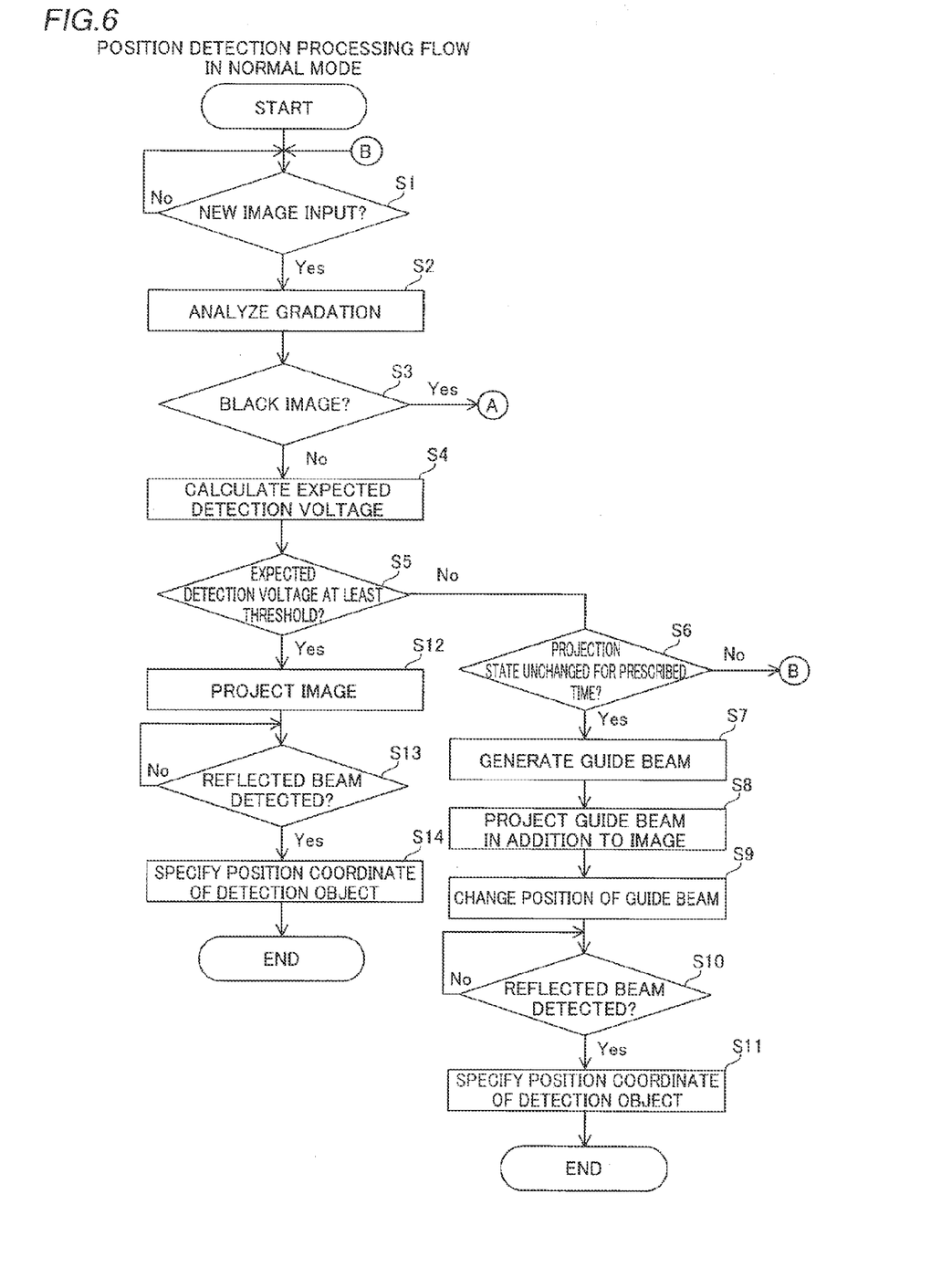
FIGS. 6 and 7 are flow charts for illustrating position detection processing in a normal mode of the projector according to the first embodiment of the present invention.
Figure 7:
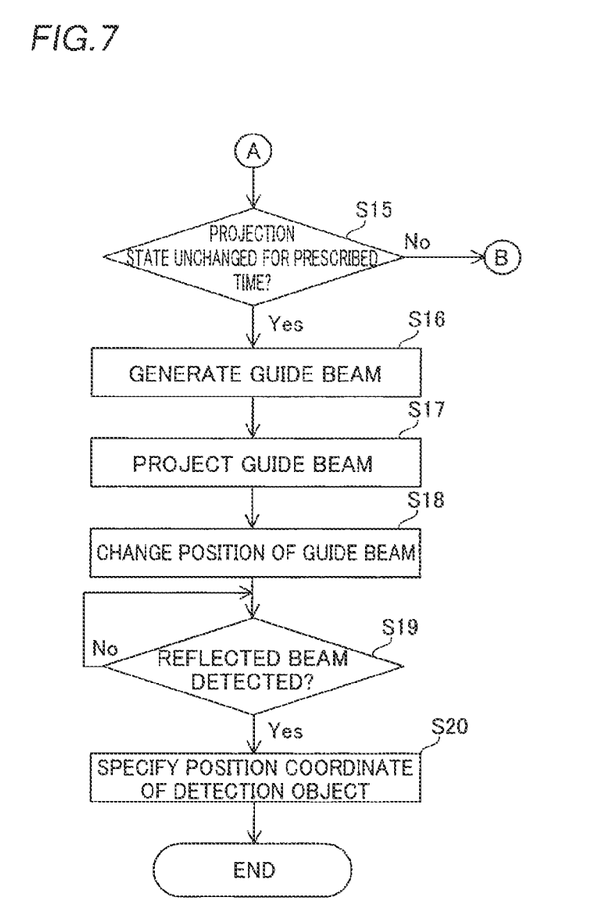

Position detection processing performed by the control portion 31 of the projector 100 according to the first embodiment in the normal mode is now described with reference to FIGS. 6 and 7.

When power is supplied to the projector 100, the control portion 31 starts the position detection processing in the normal mode.

At a step S1, the control portion 31 determines whether or not a new image has been input in the projector 100 through the video I/F 32 or the external I/F 34. The control portion 31 repeats this determination until a new image is input in the projector 100, and advances to a step S2 when the new image is input in the projector 100. Then, the control portion 31 reads information related to a gradation from an image signal of the input image, and analyzes the gradation of the image signal on the basis of the read information at the step S2.

Then, the control portion 31 determines whether or not the image is a black image on the basis of the analytical result of the gradation at a step S3. The control portion 31 determines that the image is a black image when all gradations of red, green and blue are zero, and advances to a step S15.

At a step S4, the control portion 31 calculates the expected detection voltage on the basis of acquired laser output values, reflectance values of the respective colors, transmittance values of the optical systems of the respective colors and sensitivity coefficients for the respective colors.

At a step S5, the control portion 31 compares the expected detection voltage calculated from the input image signal and the prescribed threshold (0.74025 (V)) of the silicon photodiode 10a with each other. If the expected detection voltage is larger than the prescribed threshold, the control portion 31 determines that detection of the laser beams corresponding to the input image signal by the silicon photodiode 10a is expectable and advances to a step S12. If the expected detection voltage is smaller than the prescribed threshold, on the other hand, the control portion 31 determines that detection of the laser beams corresponding to the input image signal by the silicon photodiode 10a is unexpectable and advances to a step S6.

At the step S6, the control portion 31 determines whether or not the projection state on the projection area remains unchanged for the prescribed time. When determining that the projection state on the projection area remains unchanged for the prescribed time, the control portion 31 advances to a step S7. If the projection state changes in the prescribed time due to an input of a new image or the like, on the other hand, the control portion 31 returns to the step S1.

At the step S7, the control portion 31 reads the information for generating the detection guide beam from the RAM 33, and generates the detection guide beam. More specifically, the control portion 31 incorporates information of the detection guide beam as the information of the projected image.

At a step S8, the control portion 31 transmits the information of the projected image, to which the detection guide beam is added, to the laser beam source 60 through the data transmission block 40. Thus, the detection guide beam is projected on one horizontal line in addition to the image, based on the image signal, input in the projection area. In other words, a red horizontal line is projected on the image based on the input image signal.

At a step S9, the control portion 31 changes the position of the detection guide beam by 10 lines downward from above on the projection area every frame. At a step S10, the control portion 31 determines whether or not the detection guide beam reflected by the detection object has been detected. The control portion 31 repeats this determination until the reflected detection guide beam is detected. When the reflected detection guide beam is detected, the control portion 31 specifies the position coordinate of the detection object on the projection area on the basis of the timing when the silicon photodiode 10a has detected the detection guide beam reflected by the detection object and the current scanning position with the MEMS mirror 68a.

When determining that the expected detection voltage is larger than the prescribed threshold at the step S5, the control portion 31 projects the image corresponding to the input image signal at the step S12. At a step S13, the control portion 31 determines whether or not the laser beams, corresponding to the input image signal, reflected by the detection object have been detected. The control portion 31 repeats this determination until the reflected laser beams are detected. When the reflected laser beams are detected, the control portion 31 specifies the position coordinate of the detection object on the projection area on the basis of the timing when the silicon photodiode 10a has detected the laser beams reflected by the detection object and the current scanning position with the MEMS mirror 68a at a step S14.

If determining that the image is a black image at the step S3, the control portion 31 determines whether or not the projection state on the projection area remains unchanged for the prescribed time at the step S15. When determining that the projection state on the projection area remains unchanged for the prescribed time, the control portion 31 advances to a step S16. If the projection state changes in the prescribed time due to an input of a new image or the like, on the other hand, the control portion 31 returns to the step S1.

At the step S16, the control portion 31 reads the information for generating the detection guide beam from the RAM 33, and generates the detection guide beam. At a step S17, the control portion 31 controls the red LD 61a to project only the detection guide beam on the projection area. In other words, only one red horizontal line is projected on the black image on the projection area.

At a step S18, the control portion 31 changes the position of the detection guide beam by 10 lines downward from above on the projection area every frame. At a step S19, the control portion 31 determines whether or not the detection guide beam reflected by the detection object has been detected. The control portion 31 repeats this determination until the reflected detection guide beam is detected. When the reflected detection guide beam is detected, the control portion 31 specifies the position coordinate of the detection object on the projection area on the basis of the timing when the silicon photodiode 10a has detected the detection guide beam reflected by the detection object and the current scanning position with the MEMS mirror 68a at a step S20.

According to the first embodiment, as hereinabove described, the projector 100 is provided with the control portion 31 controlling the laser beam source 60 to emit the detection guide beam, different from the laser beams corresponding to the input image signal, and to project the same on the projection area when determining that detection of the laser beams corresponding to the input image signal by the silicon photodiode 10a is unexpectable on the basis of the gradation of the input image signal so that the projector 100 projects the detection guide beam different from the laser beams corresponding to the input image signal also when projecting a image of black or quasi-black and reflected beams from the detection object cannot be or hardly obtained, whereby the beam reflected by the detection object can be detected. Thus, the projector 100 can reliably detect the detection object also when the projected image has a color hardly allowing detection of beams reflected by the detection object. Further, the laser beam source 60 emitting the laser beams on the basis of the image signal for forming the projected image can also be employed as a generation portion for the detection guide beam, whereby no generation portion such as an infrared beam generation portion dedicated to the detection guide beam may be provided. Consequently, the structure of the projector 100 can be simplified.

According to the first embodiment, as hereinabove described, the control portion 31 is formed to acquire the expected detection voltage on the basis of the gradation of the image signal and to control the red LD 61a to emit the detection guide beam and to project the same on the projection area when the acquired expected detection voltage is smaller than the prescribed threshold, whereby the projector 100 can reliably detect the detection object with the detection guide beam emitted from the red LD 61a and reflected by the detection object also when the expected detection voltage based on the gradation of the image signal is smaller than the prescribed threshold.

According to the first embodiment, as hereinabove described, the control portion 31 is formed to control the red LD 61a to emit the detection guide beam when the expected detection voltage is smaller than the prescribed threshold and the projection state continuously remains unchanged for the prescribed time so that the red LD 61*a* emits the detection guide beam only when such a state where the expected detection voltage is smaller than the prescribed threshold and detection by the silicon photodiode 10*a* is unexpectable continues for the prescribed time, whereby the image based on the input image signal can be inhibited from occurrence of noise or the like resulting from the detection guide beam to the utmost.

According to the first embodiment, as hereinabove described, the control portion 31 is formed to specify the position of the detection object on the basis of the results of detection of the laser beams, corresponding to the input image signal, reflected by the detection object without projecting the detection guide beam when the expected detection voltage is in excess of the prescribed threshold so that the control portion 31 specifies the position of the detection object by employing the laser beams corresponding to the input image signal without the detection guide beam when the expected detection voltage is in excess of the prescribed threshold, whereby the image based on the input image signal can be inhibited from occurrence of noise resulting from the detection guide beam to the utmost.

According to the first embodiment, as hereinabove described, the control portion 31 is formed to specify the position of the detection object on the basis of the scanning position with the MEMS mirror 68*a* upon detection of the detection guide beam reflected by the detection object, whereby the control portion 31 can easily specify the position of the detection object on the basis of the detection guide beam reflected by the detection object and the scanning position for the detection guide beam also when detection of the laser beams, corresponding to the image signal, detected by the detection object is unexpectable.

According to the first embodiment, as hereinabove described, the control portion 31 is formed to control the red LD 61*a* to project the detection guide beam, different from the laser beam corresponding to the image signal, on the projection area when the image signal is an image signal of black or quasi-black, whereby the projector 100 can reliably detect the detection object with the detection guide beam also when projecting the image of black or quasi-black, inhibiting or hardly allowing detection of the laser beams reflected by the detection object, on the projection area.

According to the first embodiment, as hereinabove described, the projector 100 is provided with the laser beam source 60 including the red, green and blue LDs 61*a*, 62*a* and 63*a* emitting the red, green and blue laser beams respectively and the control portion 31 is formed to control the red LD 61*a*, emitting the red laser beam highly reflectable by the detection object among the LDs 61*a* to 63*a*, to emit the detection guide beam so that the detection guide beam can be constituted of the red laser beam highly reflectable by the detection object, whereby the silicon photodiode 10*a* can accurately detect the detection guide beam reflected by the detection object.

According to the first embodiment, as hereinabove described, the projector 100 includes the silicon photodiode 10*a* having superior detection sensitivity for the red laser beam to that for the green and blue laser beams and the control portion 31 is formed to control the red LD 61*a* to emit the red detection guide beam so that the red LD 61*a* emits the red laser beam maximally reflectable by the detection object and detectable with the highest detection sensitivity as the detection guide beam, whereby the silicon photodiode 10*a* can accurately detect the reflected detection guide beam consisting of the red laser beam.

According to the first embodiment, as hereinabove described, the control portion 31 is formed to change the position of the detection guide beam in the arbitrary projection area every frame on the basis of the analytical result of the gradation of the image signal thereby changing the position of the detection guide beam in the projection area every frame, whereby the projector 100 can reliably detect the detection object regardless of the position thereof in the projection area.

According to the first embodiment, as hereinabove described, the control portion 31 is formed to control the red LD 61*a* to project the detection guide beam in one of the lines of the laser beams scanned when forming one frame so that the detection guide beam can be projected to be overlapped on only part of the image based on the input image signal, whereby the image based on the image signal can be inhibited from occurrence of noise resulting from the detection guide beam.

Second Embodiment

Figure 8:
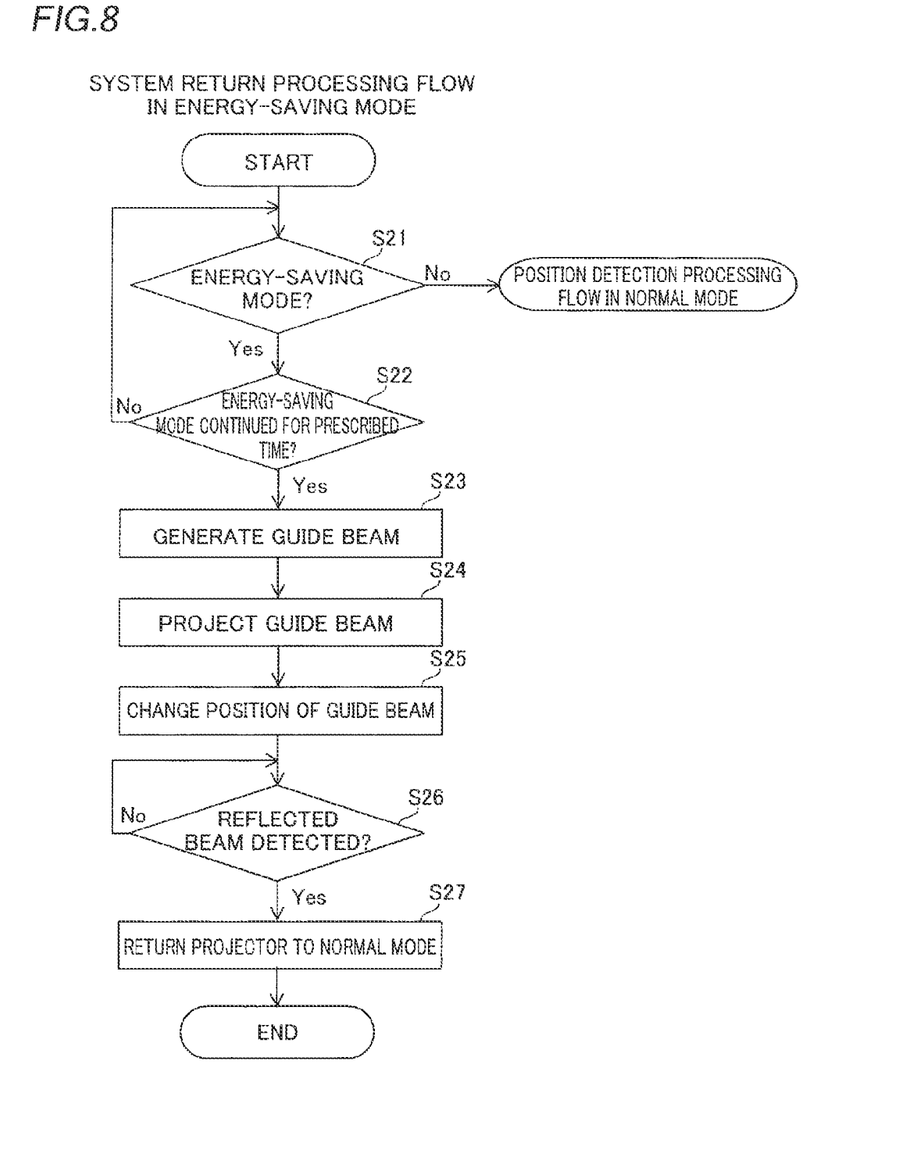
FIG. 8 is a flow chart for illustrating return processing in an energy-saving mode of a projector according to a second embodiment of the present invention.

A projector 100 (see FIG. 1) according to a second embodiment of the present invention is now described with reference to FIG. 8.

According to the second embodiment, a control portion 31 controls a red LD 61*a* to project a detection guide beam for detection in such an energy-saving mode that the projector 100 stands by in a state suppressing power consumption, dissimilarly to the aforementioned first embodiment.

The control portion 31 is formed to control the red LD 61*a* to emit the detection guide beam and to project the same on an arbitrary projection area when the projector 100 is in the energy-saving mode and the energy-saving mode is continued for a prescribed time (one minute, for example). In the energy-saving mode, the projector 100 projects no image based on an input image signal on the projection area, and hence the control portion 31 controls the red LD 61*a* to project only the detection guide beam. Further, the control portion 31 is formed to return the projector 100 from the energy-saving mode to a normal mode when a silicon photodiode 10*a* detects the detection guide beam reflected by the detection object in the energy-saving mode.

The processing performed by the control portion 31 for returning the projector 100 according to the second embodiment from the energy-saving mode to the normal mode is now described with reference to FIG. 8.

At a step S21, the control portion 31 determines whether or not the projector 100 is in the energy-saving mode. When determining that the projector 100 is not in the energy-saving mode, the control portion 31 executes position detection processing (see FIGS. 6 and 7) in the normal mode.

At a step S22, the control portion 31 determines whether or not the energy-saving mode has been continued for the prescribed time. The control portion 31 repeats the determinations at the steps S21 and S22 until the prescribed time elapses. When the energy-saving mode is continued for the prescribed time, the control portion 31 reads information for generating the detection guide beam from a RAM 33 at a step S23 and generates the detection guide beam. At a step S24, the control portion 31 controls the red LD 61*a* to project only the detection guide beam on the projection area. In other words, only a red horizontal line is projected on the projection area.

At a step S25, the control portion 31 changes the position of the detection guide beam by 10 lines downward from above on the projection area every frame. At a step S26, the control portion 31 determines whether or not the detection guide beam reflected by the detection object has been detected. The control portion 31 repeats this determination until the reflected detection guide beam is detected. When the reflected detection guide beam is detected, the control portion 31 returns the projector 100 from the energy-saving mode to the normal mode at a step S27.

The remaining structure of the second embodiment is similar to that of the aforementioned first embodiment.

According to the second embodiment, as hereinabove described, the control portion 31 is formed to control the red LD 61a to project the detection guide beam on the projection area when determining that detection of laser beams corresponding to the image signal is unexpectable on the basis of the gradation of the image signal in the normal mode and to control the red LD 61a to project the detection guide beam on the projection area when the projector 100 is in the energy-saving mode and the energy-saving mode is continued for the prescribed time, whereby the projector 100 can reliably detect the detection object with the detection guide beam also when the same is in the energy-saving mode projecting no image based on the input image signal.

According to the second embodiment, as hereinabove described, the control portion 31 is formed to control the red LD 61a to project the detection guide beam in addition to a laser beam corresponding to the image signal when projecting the laser beam corresponding to the image signal in the normal mode and to control the red LD 61a to project only the detection guide beam in the energy-saving mode, whereby the projector 100 can reliably detect the detection object by projecting the detection guide beam in a state projecting the image based on the image signal in the normal mode and can detect the detection object by projecting only the detection guide beam in the energy-saving mode.

According to the second embodiment, as hereinabove described, the control portion 31 is formed to return the projector 100 from the energy-saving mode to the normal mode when the silicon photodiode 10a detects the detection guide beam reflected by the detection object in the energy-saving mode. When forming the control portion 31 in this manner, the user can easily return the projector 100 from the energy-saving mode to the normal mode by simply arranging the detection object on the projection area in the energy-saving mode.

The remaining effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

While the color information in the present invention is the gradation in each of the aforementioned first and second embodiments, the present invention is not restricted to this. According to the present invention, the color information may alternatively be an element other than the gradation.

While the projector projects the detection guide beam on the basis of the expected detection voltage as the expected detection value calculated from the analytical result of the color information in each of the aforementioned first and second embodiments, the present invention is not restricted to this. According to the present invention, the projector may alternatively project the detection guide beam when the control portion determines that detection of the laser beams, corresponding to the input image signal, reflected by the detection object is unexpectable on the basis of the color information (gradation) without employing the expected detection value.

While the silicon photodiode serving as the light detection portion has the threshold (0.74025 (V)) in each of the aforementioned first and second embodiments, the present invention is not restricted to this. According to the present invention, the threshold may alternatively have a value other than 0.74025 (V).

While the silicon photodiode is shown as an example of the light detection portion in each of the aforementioned first and second embodiments, the present invention is not restricted to this. According to the present invention, the light detection portion may alternatively be an element other than the silicon photodiode.

While the red LD (red laser beam generation portion) emits the red laser beam as the detection guide beam in each of the aforementioned first and second embodiments, the present invention is not restricted to this. According to the present invention, the projector may alternatively emit a laser beam of a color other than red as the detection guide beam. For example, the green laser beam highly reflectable by the detection object subsequently to the red laser beam and detectable by the silicon photodiode with excellent detection sensitivity may be employed as the detection guide beam, or a laser beam of a mixed color of red and green may be employed as the detection guide beam. Further, the blue laser beam generation portion may emit the detection guide beam, or at least two of the red, green and blue laser beam generation portions may combinedly emit detection guide beams.

While the projector projects the detection guide beam on one horizontal line downward from above the frame (image display frame) in each of the aforementioned first and second embodiments, the present invention is not restricted to this. According to the present invention, the projector may alternatively project the detection guide beam on a vertical line rightward from the left side (or leftward from the right side) of the image display frame, or may project the detection guide beam on an oblique line. Further alternatively, the projector may combinedly project the detection guide beam on the horizontal, vertical and oblique lines.

While the projector projects the detection guide beam on one of the lines forming one frame (image display frame) in each of the aforementioned first and second embodiments, the present invention is not restricted to this. According to the present invention, the projector may alternatively project the detection guide beam on at least two lines so far as the same are part of the lines forming one image display frame.

While the projector projects the detection guide beam every continuous frame (image display frame) in each of the aforementioned first and second embodiments, the present invention is not restricted to this. According to the present invention, the projector may alternatively project the detection guide beam every other image display frame (every two image display frames) or every arbitrary image display frame, for example. When forming the projector in this manner, occurrence of noise resulting from the detection guide beam can be suppressed to the utmost by projecting the detection guide beam not every image display frame but every plurality of image display frames. Consequently, occurrence of flickering or the like on the screen can be suppressed to the utmost.

While the projector projects the detection guide beam on one horizontal line in each of the aforementioned first and second embodiments, the present invention is not restricted to this. According to the present invention, the projector may alternatively project the detection guide beam on a prescribed area and may move the area every image display frame, for example.

While the projector projects the detection guide beam when the projection state remains unchanged for one minute as the prescribed time in each of the aforementioned first and second embodiments, the present invention is not restricted to this. According to the present invention, the projector may alternatively project the detection guide beam when the projection state remains unchanged for a time less than or longer than one minute.

While one frame (image display frame) of the projection area has the resolution of 800 by 600 (pixels) in each of the aforementioned first and second embodiments, the present invention is not restricted to this. According to the present invention, one frame may alternatively have resolution of other than 800 by 600 (pixels).

While the processing operations of the control portion in starting and after the starting are described with reference to the flow charts written in event-driven and flow-driven manners respectively for the convenience of illustration in each of the aforementioned first and second embodiments, the present invention is not restricted to this. The control portion may alternatively operate in a completely event-driven manner, in a completely flow-driven manner or in a parallel-processing manner.

While the present invention is applied to the projector (dedicated projector) in each of the aforementioned first and second embodiments, the present invention is not restricted to this. The present invention may alternatively be applied to an electronic apparatus, other than the projector (dedicated projector), having a projector function. For example, the present invention may be applied to a portable apparatus (a portable information terminal or a portable telephone) having a projector function.

What is claimed is:

1. A projector comprising:
a laser beam generation portion emitting a laser beam for forming an image on the basis of an input image signal;
a projection portion projecting the image;
a light detection portion detecting said laser beam reflected by a detection object; and
a control portion acquiring a predicted detection value of said light detection portion from a table associating output current with gradation of color on the basis of a color information of said input image signal and controlling said laser beam generation portion for forming the image to emit a beam to be used for detection of said detection object, and to project said beam to be used for detection on an arbitrary projection area when acquired said predicted detection value is smaller than a prescribed threshold.

2. The projector according to claim 1, wherein
said control portion is formed to control said laser beam generation portion to emit said beam to be used for detection and to project said beam to be used for detection on said arbitrary projection area when said predicted detection value is smaller than said prescribed threshold and a projection state continuously remains unchanged for a prescribed time.

3. The projector according to claim 1, wherein
said control portion is formed to specify the position of said detection object on the basis of a result of detection of said laser beam, corresponding to said input image signal, reflected by said detection object without projecting said beam to be used for detection when said acquired predicted detection value is in excess of said prescribed threshold.

4. The projector according to claim 1, wherein
said control portion is formed to specify the position of said detection object on the basis of a scanning position of said beam to be used for detection with said projection portion at a time when said light detection portion detects said beam to be used for detection reflected by said detection object.

5. The projector according to claim 1, wherein
said control portion is formed to control said laser beam generation portion to emit said beam to be used for detection different from said laser beam corresponding to said input image signal and to project said beam to be used for detection on said arbitrary projection area when said input image signal is an image signal of black or quasi-black.

6. The projector according to claim 1, wherein
said laser beam generation portion includes a red laser beam generation portion emitting a red laser beam, a green laser beam generation portion emitting a green laser beam and a blue laser beam generation portion emitting a blue laser beam, and
said control portion is formed to control at least one of said red laser beam generation portion, said green laser beam generation portion and said blue laser beam generation portion emitting a laser beam highly reflectable by said detection object to emit said beam to be used for detection.

7. The projector according to claim 1, wherein
said laser beam generation portion includes a red laser beam generation portion emitting a red laser beam, a green laser beam generation portion emitting a green laser beam and a blue laser beam generation portion emitting a blue laser beam,
said light detection portion has such characteristics that detection sensitivity varies with the wavelength of detected said laser beam, and
said control portion is formed to control at least one of said red laser beam generation portion, said green laser beam generation portion and said blue laser beam generation portion emitting a laser beam having a wavelength detectable by said light detection portion with excellent detection sensitivity to emit said beam to be used for detection.

8. The projector according to claim 6, wherein
said light detection portion includes such a light detection portion that detection sensitivity for said red laser beam is superior to detection sensitivity for said green and blue laser beams, and
said control portion is formed to control said red laser beam generation portion to emit said beam to be used for detection consisting of said red laser beam.

9. The projector according to claim 1, wherein
said control portion is formed to control said projection portion to project said image while changing the position of said beam to be used for detection in said arbitrary projection area every image display frame projected on said projection area on the basis of an analytical result of said color information of said input image signal.

10. The projector according to claim 1, wherein
said control portion is formed to control said laser beam generation portion to project said beam to be used for detection into said arbitrary projection area every plurality of image display frames projected on said projection area on the basis of an analytical result of said color information of said input image signal.

11. The projector according to claim 9, wherein said control portion is formed to control said laser beam generation portion to project said beam to be used for detection on a partial line among lines of said laser beam scanned when forming one said image display frame.

12. The projector according to claim 1, wherein said control portion is formed to control said laser beam generation portion to emit said beam to be used for detection and to project said beam to be used for detection on said arbitrary projection area when acquired said predicted detection value is smaller than said prescribed threshold on the basis of said color information of said input image signal in a normal mode and to control said laser beam generation portion to emit said beam to be used for detection and to project said beam to be used for detection on said arbitrary projection area in a case of such an energy-saving mode that said image based on said input image signal is not projected when said energy saving mode is continued for a prescribed time.

13. The projector according to claim 12, wherein said control portion is formed to control said laser beam generation portion to project said beam to be used for detection on said arbitrary projection area in addition to said laser beam corresponding to said input image signal when projecting said laser beam corresponding to said input image signal in said normal mode and to control said laser beam generation portion to project only said beam to be used for detection on said arbitrary projection area in said energy saving mode.

14. The projector according to claim 12, wherein said control portion is formed to return the projector from said energy saving mode to said normal mode when said light detection portion detects said beam to be used for detection reflected by said detection object in said energy saving mode.

15. An electronic apparatus having a projector function, comprising:
a laser beam generation portion emitting a laser beam for forming an image on the basis of an input image signal;
a projection portion projecting the image;
a light detection portion detecting said laser beam reflected by a detection object; and
a control portion acquiring a predicted detection value of said light detection portion from a table associating output current with gradation of color on the basis of a color information of said input image signal and controlling said laser beam generation portion for forming the image to emit a beam to be used for detection of said detection object, and to project said beam to be used for detection on an arbitrary projection area when acquired said predicted detection value is smaller than a prescribed threshold.

16. The electronic apparatus having a projector function according to claim 15, wherein said control portion is formed to control said laser beam generation portion to emit said beam to be used for detection and to project said beam to be used for detection on said arbitrary projection area when said predicted detection value is smaller than said prescribed threshold and a projection state continuously remains unchanged for a prescribed time.

17. The electronic apparatus having a projector function according to claim 15, wherein said control portion is formed to specify the position of said detection object on the basis of a result of detection of said laser beam, corresponding to said input image signal, reflected by said detection object without projecting said beam to be used for detection when said acquired predicted detection value is in excess of said prescribed threshold.

18. The electronic apparatus having a projector function according to claim 15, wherein said control portion is formed to specify the position of said detection object on the basis of a scanning position of said beam to be used for detection with said projection portion at a time when said light detection portion detects beam to be used for detection reflected by said detection object.

19. The projector according to claim 1, wherein the gradation of color includes gradations of respective colors of red, green, and blue.

20. The projector according to claim 1, wherein the control portion controls said laser beam generation portion to switch between a projection of said beam to be used for detection of said detection object and a non-projection on the basis of said prescribed threshold.

* * * * *